United States Patent [19]
French et al.

[11] 3,903,946
[45] Sept. 9, 1975

[54] PNEUMATIC TIRE AND WHEEL ASSEMBLIES

[75] Inventors: Tom French, Sutton Coldfield; Erwin Herbert Erhard Martin, Coventry, both of England

[73] Assignee: Dunlop Limited, England

[22] Filed: Mar. 9, 1973

[21] Appl. No.: 339,844

[30] Foreign Application Priority Data
Mar. 11, 1972 United Kingdom............ 11510/72

[52] U.S. Cl. .... 152/330 L; 152/330 RF; 152/353 R; 152/362 R; 152/379; 152/399
[51] Int. Cl.² .................. B60C 17/00; B60C 15/00
[58] Field of Search 152/158, 330 R, 340, 352–354, 152/378, 379, 396, 399, 405, 362 R, 330 L, 330 RF, 353 R, 362 R

[56] References Cited
UNITED STATES PATENTS
2,987,093  6/1961  Urbon............................ 152/340
3,739,829  6/1973  Powell et al....................... 152/330

*Primary Examiner*—Drayton E. Hoffman
*Attorney, Agent, or Firm*—Stevens, Davis, Miller & Mosher

[57] ABSTRACT

An enclosing means for lubricant for use in a pneumatic tire and wheel assembly to be located on or adjacent the interior surface of at least one lower sidewall region of the tire. The means comprises a closed annular pocket, at least one radially extending portion of a wall of which is constructed to be under greater stress than the remaining portions when the pocket is filled with lubricant and located in the tire. The greater stressed portion is located nearest to the interior surfaces of the tire when in use to urge the pocket towards the interior surface of the tire against counteracting centrifugal forces which tend to urge the pocket away from the surface. Also included is a tire and wheel assembly.

16 Claims, 11 Drawing Figures

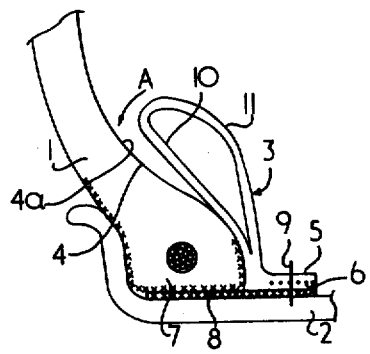
FIG. 1.
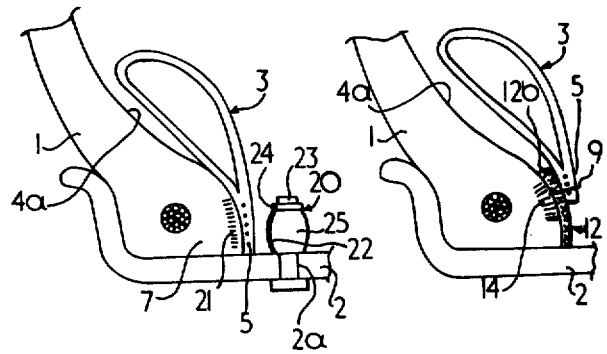
FIG. 6.    FIG. 3.
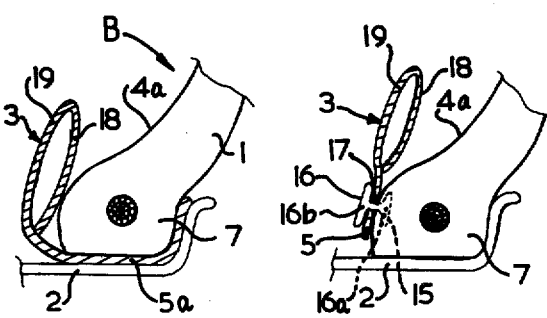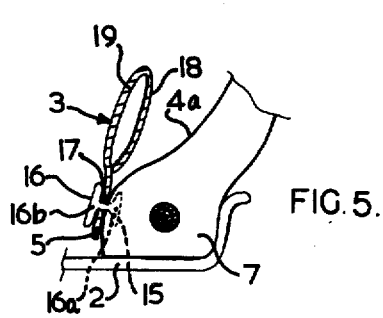
FIG. 4    FIG. 5.
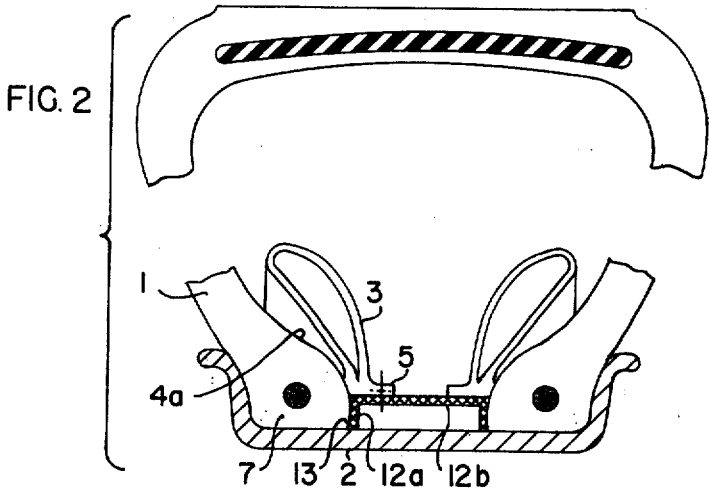
FIG. 2

PNEUMATIC TIRE AND WHEEL ASSEMBLIES

This invention relates to a pneumatic tire and wheel assembly.

Upon partial or complete deflation of a pneumatic tire mounted on a wheel during the running of a vehicle opposite surfaces in the interior of the tire and wheel assembly come into contact with one another under more or less load according to whether or not the deflation is complete; the regions of the interior surfaces which normally come into contact are the interior surfaces of the tire close to but radially outwardly of the rim flanges and the interior surfaces of the tire close to but radially inwardly of the tread edge.

When the surfaces come into contact considerable heat is generated within the rubber and textile components of the tire and very rapid structural failure ensues. It has been discovered that the major source of the heat generated is caused by the relative movement of the surfaces in contact and under load and the temperature rise is particularly marked because of the high coefficient of friction of dry rubber to dry rubber.

This disadvantage may be reduced or obviated by the use of lubricant in containers as described in assignee's U.S. Pat. application No. 150,627, filed June 7, 1971.

It is an object of the present invention to provide an improved enclosing means for lubricant for insertion into a pneumatic tire and wheel assembly.

According to the invention an enclosing means for a lubricant for the interior surfaces of a pneumatic tire to be located when in use on or adjacent the interior surface of at least one lower sidewall region of the tire comprises a closed annular pocket, at least one portion of a wall of the pocket extending substantially radially of the pocket being constructed to be under greater stress than the remaining portions when the pocket is filled with a lubricant and located in the tire, said greater stressed portion being located nearest to the interior surfaces of the tire when in use whereby the pocket is urged towards the interior surface of the tire against counteracting centrifugal forces which tend to urge the pocket away from the interior surface during use of the tire mounted on a wheel.

In addition, according to the invention a pneumatic tire and wheel assembly incorporates an enclosing means for lubricant comprising a closed annular pocket secured by means of an integral flap to the bead region of the tire whereby said pocket is located in a position on or adjacent to the interior surface of at least one lower sidewall region of the tire.

The enclosing means preferably releases the lubricant into the interior of the tire by impact or abrasion on the enclosing means by the interior surfaces of the tire which come into contact when the tire is deflated.

Additionally, the annular pocket may be provided with a constricted portion of a rupture strength greater than the rupture strength of the remainder of the pocket to prevent circumferential flow of the lubricant whereby, in use the pocket is nipped between the interior surfaces of the tire which come into contact when the tire is deflated and on rotation of the tire the lubricant is compressed against the constricted portion and the pocket caused to rupture.

Preferably the enclosing means is made of elastomeric material. The portion of the pocket of greater stress, in use, may be constructed by making that portion thicker than the remaining portion. Alternatively, material of lower extensibility may be used for this portion of greater stress as compared to the material at the remaining portions. In a further alternative construction, the portion of greater stress may comprise a cord fabric reinforced portion thus causing the portion to be of lower extensibility than the remaining portions of the pocket.

Preferably the pocket has a base portion in the form of an integral flap extending from one side thereof, the base portion being used to retain the pocket in a lower side wall region of the tire.

The pocket may be retained, for example, by being attached by the base portion in the bead region of the tire. Alternatively, the base portion may be of sufficient length to be trapped between a bead of the tire and a rim of the wheel upon which the tire is mounted during use. In a further modification the base portion of the pocket may be trapped between the tire bead and bead retaining devices on the wheel rim, e.g., of the type described in assignee's co-pending U.S. application No. 333,381, filed Feb. 16, 1973.

In order to facilitate attachment of the base portion to the bead region of the tire, the tire and wheel assembly incorporating an enclosing means according to the invention may be provided with bead retaining devices, or alternatively, the tire of the assembly may be provided with a fabric flap to which the base may be attached.

The enclosing means is preferably located in each of the lower sidewall regions of the tire to ensure even distribution of the lubricant on deflation of the tire.

The enclosing means may be divided into compartments, to eliminate the possibility of the whole of the lubricant being released by a single accidental severe impact.

In addition, it may be desirable to create unbalance in the tire and wheel assembly on deflation thereof to warn the user of the deflated condition of the assembly. For example, this may be achieved by inserting into one of the compartments, mentioned in the preceding paragraph, material, e.g., rubber, which is not released on deflation of the assembly.

Embodiments of the invention will now be described by way of example only with reference to the accompanying drawings of which:

FIG. 1 shows a diagrammatic axial cross-sectional view of the bead region of the tire mounted on a wheel rim incorporating an enclosing means according to a first embodiment of the invention;

FIG. 2 shows a similar view to FIG. 1 according to a second embodiment of the invention;

FIG. 3 shows a similar view to FIG. 1 according to a modification of the second embodiment of the invention;

FIG. 4 shows a similar view to FIG. 1 according to a third embodiment of the invention;

FIG. 5 shows a similar view of FIG. 1 according to a fourth embodiment of the invention;

FIG. 6 shows a similar view to FIG. 1 according to a fifth embodiment of the invention;

Figure 7:
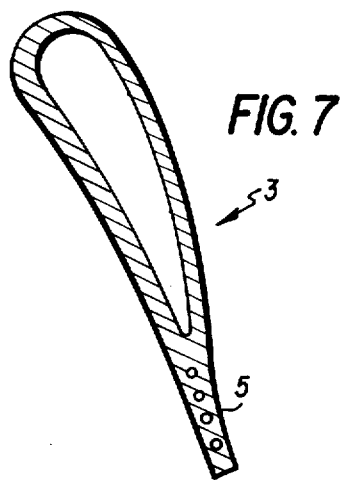
FIG. 7 is a sectional view of a closed annular pocket having one wall thicker than the remaining portions.
Figure 8:
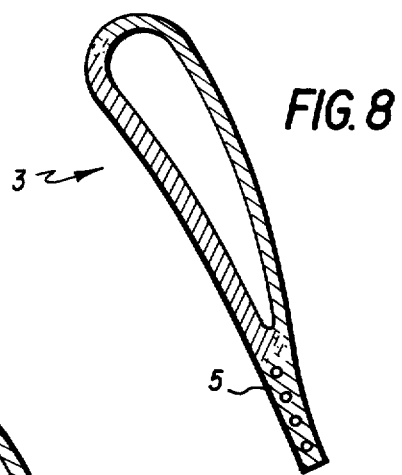
FIG. 8 is similar to FIG. 7 with one wall being of a material of lower extensibility than the remaining portions.
Figure 9:
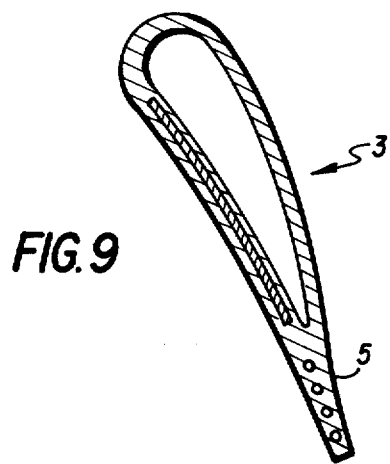
FIG. 9 is similar to FIG. 7 with one wall having a cord fabric reinforcement.
Figure 10:
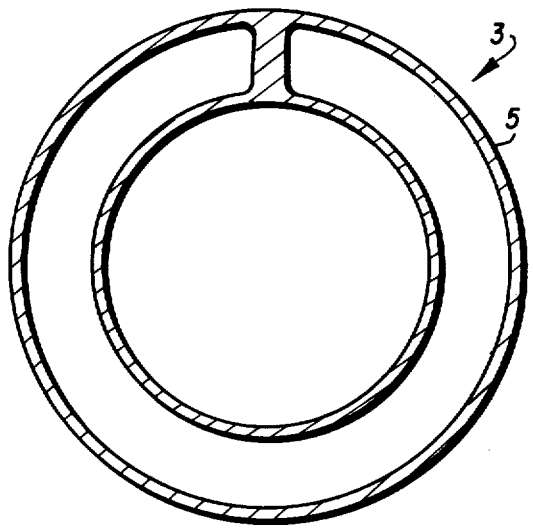
FIG. 10 is a section view taken along the mid-circumferential plane of a closed annular pocket having a restricted portion.
Figure 11:
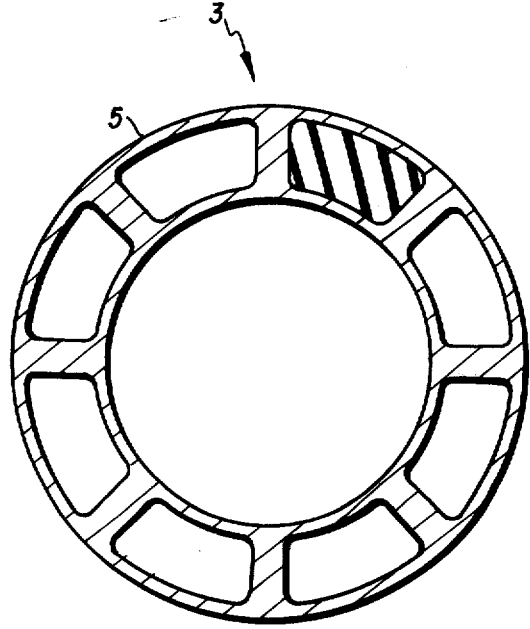
FIG. 11 is similar to FIG. 10, the pocket being divided into compartments with one compartment being filled with a rubber material which is not released upon deflation of the tire.

Referring to FIGS. 1 to 6 similar reference numerals in each of the FIGURES refer to like parts. In all the FIGURES there is shown the bead region 1 of a tire mounted on a wheel rim 2.

Referring particularly to FIG. 1 an enclosing means comprises a closed annular pocket 3 located adjacent the interior surface 4a in the lower sidewall region 4 of the tire. The pocket 3 is provided with a base portion 5 reinforced with a layer of cord fabric 6, the pocket 3 being securely attached by the base portion 5 to the bead region 1 of the tire. The tire bead 7 has an extended toe portion 8 of rubberized cord fabric. The base 5 is attached to the extended toe 8 by a staple 9.

In order to maintain the pocket 3 close to the interior surface 4a of the tire the pocket 3 is provided with a portion 10 of greater stress than the remaining portion 11 of the pocket 3 when the pocket is filled with lubricant and inserted into the tire during use. The greater stress in the portion 10 is achieved by making the portion 10 of greater thickness than the portion 11, the differential stresses set up between the portions 10 and 11 causing the pocket to be urged in the direction of arrow A, thus counteracting centrifugal forces which tend to straighten the pocket 3 away from the area of contact during use of the tire. An example of the relative thicknesses of the portions 10 and 11 is; portion 10, 2 millimeters and portion 11, 1 millimeter.

Referring to FIG. 2, the pocket 3 is of similar construction to the pocket described with reference to FIG. 1. The bead region 7 of the tire is, however, provided with a fabric flap 12, the flap 12 having two portions 12a and 12b. The portion 12a extending from the bead toe 13 along the interior surface 4a of the tire and being secured thereto and the portion 12b extending substantially perpendicularly away from the interior surface 4a of the tire. The base portion 5 of the pocket 3 is stapled to the portion 12b.

In a modification of the embodiment shown in FIG. 2, (see FIG. 3), the portion 12b of the fabric of the flap 12 does not extend perpendicular from the interior surface 4a of the tire but extends substantially parallel thereto, the base 5 of the pocket 3 being attached by staple 9 to the portion 12b of the flap 12. The base portion 5 is insulated from the inner lining of the tire by the portion 12b of the flap 12 in the area 14 indicated by shading in FIG. 3.

In the embodiment shown in FIGS. 2 and 3, the pocket is urged towards the inner surface during use in the tire in a similar manner to that described with reference to FIG. 1.

In the embodiment shown in FIG. 4, the pocket 3 has an extended base portion 5a, the pocket 3 being maintained in position in the tire and wheel assembly by the base portion 5a being located between the bead portion 7 of the tire and the wheel rim 2.

In the embodiment shown in FIG. 5, the bead 7 of the tyre is provided with a series of circumferentially spaced holes 15 on the interior surface 4a into which one end 16a of studs 16 may be inserted. The studs 16 may comprise metal, rubber or plastics material. The base 5 of the pocket 3 is provided with corresponding holes 17 through which the other end 16b of studs 16 are located in order to retain the pocket 3 adjacent the interior surface 4a of the lower sidewall region 4 of the tire.

In the embodiments shown in FIGS. 4 and 5 the pocket 3 is urged, during use of the pocket on the tire, towards the interior surface 4a of the tire by having a portion 18 of less extensibility than a portion 19 of the pocket 3, the differential stresses set up between the two portions 18 and 19 urge the pocket 3 in the direction of arrow B thus counteracting centrifugal forces which tend to straighten the pocket 3 away from the area of contact. The difference in extensibility may be achieved, for example, by making the portions 18 and 19 of different rubber compounds, or by including reinforcement in the portion 18, e.g., of cord textile or fabric material.

In the embodiment shown in FIG. 6 the rim 2 of the wheel is provided with a bead retaining device 20 of the type described in the assignee's co-pending U.S. Pat. application No. 333,381 filed Feb. 16, 1973. The base 5 of the pocket 3 is positioned adjacent the bead portion 7 of the tire and may be held in place using adhesive as shown by the shaded portion 21 in FIG. 6. Adhesive may also be used in the embodiments shown in FIGS. 1 to 5. The devices 20 are inserted through holes 2a in the rim 2 of the wheel and the screw 23 is tightened by screwing into the nut 24 which causes a cylinder of rubber 25 to be compressed to provide an expanded portion 22 and traps the base 5 between the portion 22 and the bead portion 7. The pocket 3 is urged towards the interior surface 4a of the tire in a similar manner to that described with reference to FIGS. 1 to 3.

Having now described our invention — What we claim is:

1. A pneumatic tire comprising a tread portion, a pair of sidewalls each terminating in an annular bead portion and a closed annular pocket containing a lubricant for the interior surfaces of the tire located on or adjacent the interior surface of at least one lower sidewall region of said tire, at least one portion of a wall of the pocket extending substantially radially of the pocket being constructed to be under greater stress than the remaining portions when the pocket is filled with a lubricant and located in the tire, said greater stressed portion being located nearest to the interior surface of the tire whereby the pocket is urged towards the interior surface of the tire against counteracting centrifugal forces which tend to urge the pocket away from the interior surface during use of the tire mounted on a wheel.

2. A pneumatic tire according to claim 1 wherein the pocket is positioned adjacent the interior surfaces of the tire which come into contact when the tire is deflated so that the lubricant is released into the interior of the tire by impact.

3. A pneumatic tire according to claim 1 wherein the pocket is positioned adjacent the interior surfaces of the tire which come into contact when the tire is deflated so that the lubricant is released into the interior of the tire by abrasion.

4. A pneumatic tire according to claim 1 wherein the annular pocket is provided with a constricted portion of a rupture strength greater than the rupture strength of the remainder of the pocket to prevent circumferential flow of the lubricant.

5. A pneumatic tire according to claim 1 wherein the annular pocket comprises an elastomeric material.

6. A pneumatic tire according to claim 1 wherein the portion of the pocket of greater stress is thicker than the remaining portions.

7. A pneumatic tire according to claim 1 wherein the portion of the pocket of greater stress is of a material of lower extensibility than the material of the remaining portions.

8. A pneumatic tire according to claim 1 wherein a cord fabric reinforcement is included in the portion of the pocket of greater stress whereby the portion is of lower extensibility than the remaining portions.

9. A pneumatic tire according to claim 1 wherein the pocket is secured to a lower sidewall region of the tire by means of an integral flap extending from one side of the pocket.

10. A pneumatic tire according to claim 1 wherein the pocket is divided into compartments.

11. A pneumatic tire according to claim 10 wherein one of the compartments is filled with a material which is not released on deflation of the tire during use.

12. A pneumatic tire according to claim 11 wherein one of the compartments is filled with rubber.

13. A pneumatic tire and wheel rim assembly comprising a tire having a tread portion and a pair of sidewalls each terminating in an annular bead portion and a wheel rim having a pair of opposed annular flanges, a closed annular pocket containing a lubricant secured by means of a flap integral with said pocket to the bead region of the tire whereby said pocket is located in a position on or adjacent to the interior surface of at least one sidewall region of the tire.

14. A pneumatic tire and wheel rim assembly according to claim 13 wherein the flap is trapped between the bead of the tire and the adjacent portion of the rim of the wheel.

15. A pneumatic tire and wheel rim assimbly according to claim 13 wherein the flap is trapped between the bead of the tire and a bead retaining device mounted on the wheel rim.

16. A pneumatic tire and wheel assembly according to claim 13 wherein the flap on the pocket is attached to a flap integral with the tire bead region.

* * * * *